Oct. 24, 1933.  W. D. WRIGHT  1,932,029
MOTION PICTURE APPARATUS
Filed Jan. 17, 1931
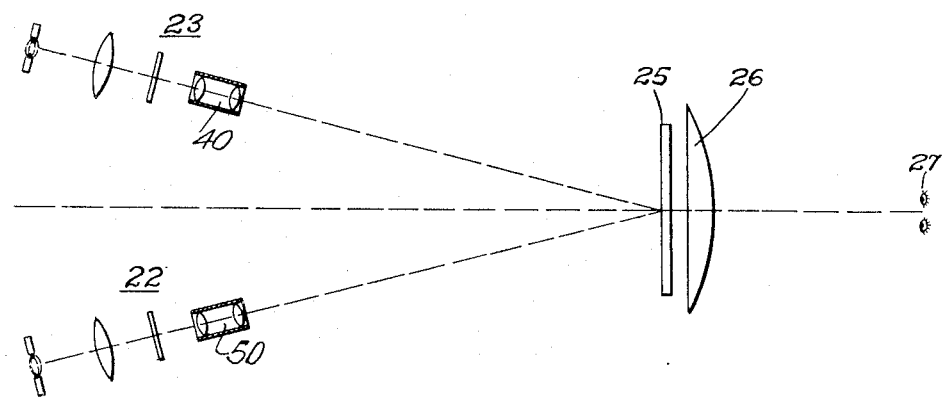
WITNESSES:
C. J. Weller.
Hymen Diamond
INVENTOR
William D. Wright.
BY
Merley G. Carr
ATTORNEY Patented Oct. 24, 1933

1,932,029

UNITED STATES PATENT OFFICE 1,932,029

MOTION PICTURE APPARATUS

William David Wright, London, England, assignor to Westinghouse Electric & Manufacturing Company, a corporation of Pennsylvania Application January 17, 1931. Serial No. 509,352

1 Claim. (Cl. 88—16.6)

My invention relates to motion-picture apparatus and has particular relation to stereoscopic screens.

It is an object of my invention to provide a stereoscopic system wherein the observer shall be capable of seeing a stereoscopic picture without the aid of synthetizing media of a type adapted to distinguish the view of one of his eyes from that of the other.

The apparatus provided in accordance with the teachings of the prior art to which I am aware is specifically adapted for systems wherein the audience is equipped with a picture synthetizing device of a type whereby the light reflected into one eye is differentiated from the light reflected into the other eye.

After considerable experiment in the field of stereoscopic projection I have found that, if a stereoscopic picture, the elements of which are projected from two machines, is observed through a translucent screen, a stereoscopic effect is seen without the aid of a particular type of synthetizing lenses. The stereoscopic effect is enhanced by the provision of a converging lens disposed behind the screen, and the effect is most satisfactory if the lens is of such structure that the lenses of the machine and the eyes of the observer are at substantially conjugate focal planes thereof.

The novel features that I consider characteristic of my invention are set forth with particularity in the appended claim. The invention itself, however, both as to its organization and its method of operation, together with additional objects and advantages thereof, will best be understood from the following description of specific embodiments when read in connection with the accompanying drawing, in which:

The single figure is a schematic view illustrating a preferred embodiment of my invention.

In the drawing, a system wherein the synthetizing glasses are not necessary, is illustrated. The system comprises a plurality of projection units 22 and 23, whereby the elements of the picture are projected and superposed upon a translucent screen 25, and a lens 26. A stereoscopic picture is seen through the lens 26.

The eyes 27 and 28 of the observer see the two elements of the picture with unequal prominence. His right eye 27 sees the picture projected by the machine 22 on his left more prominently than the picture projected by the machine 23 on his right, while his left eye sees the picture projected by the machine 23 on his right more prominently than the picture projected by the machine 22 on his left. The effect is visible when a ground glass screen alone is utilized and is enhanced by the lens, since the directional effects of the beams are thus accentuated.

It is preferable that the projection lenses 40 and 50 of the projection systems 22 and 23 lie approximately in the region of a plane which is the focal conjugate of the plane in which the eyes 27 and 28 of the observer lie.

As illustrated in the drawing, the screen 25 and the lens 26 are separate. It is apparent that they may also be combined, one surface of the lens being ground and the moving surface being polished.

Although I have shown and described certain specific embodiments of my invention, I am fully aware that many modifications thereof are possible. My invention, therefore, is not to be restricted except insofar as is necessitated by the prior art and by the spirit of the appended claim.

I claim as my invention:

Stereoscopic apparatus comprising a plurality of projectors adapted to project superposed the elements of a stereoscopic picture, and a screen comprising a ground-glass surface and a light-converging surface, said light-converging surface being so dimensioned that the prospective position of the eyes of an observer and the projection lenses of said projectors are in approximate conjugate focal planes.

WILLIAM DAVID WRIGHT.